United States Patent
Hua et al.

(10) Patent No.: US 11,340,789 B2
(45) Date of Patent: May 24, 2022

(54) PREDICTIVE REDISTRIBUTION OF CAPACITY IN A FLEXIBLE RAID SYSTEM

(71) Applicant: EMC IP HOLDING COMPANY LLC, Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

( * ) Notice: Subject to any disclaimer, the term of this patent is extended or adjusted under 35 U.S.C. 154(b) by 57 days.

(21) Appl. No.: 17/068,880

(22) Filed: Oct. 13, 2020

(65) Prior Publication Data
US 2022/0113875 A1   Apr. 14, 2022

(51) Int. Cl.
    *G06F 3/06* (2006.01)
(52) U.S. Cl.
    CPC .......... *G06F 3/0607* (2013.01); *G06F 3/0608* (2013.01); *G06F 3/0619* (2013.01); *G06F 3/0629* (2013.01); *G06F 3/0644* (2013.01); *G06F 3/0689* (2013.01)
(58) Field of Classification Search
    None
    See application file for complete search history.

(56) References Cited

U.S. PATENT DOCUMENTS

| | | | | |
|---|---|---|---|---|
| 5,258,984 A * | 11/1993 | Menon | ................... | G11C 29/88 714/6.32 |
| 10,089,026 B1 * | 10/2018 | Puhov | ................... | G06F 3/0665 |
| 10,152,254 B1 * | 12/2018 | Kang | ................... | G06F 3/0619 |
| 10,635,344 B2 * | 4/2020 | Agombar | ............... | G06F 3/0608 |
| 2005/0063217 A1 * | 3/2005 | Shiraishi | ............. | G06F 11/1096 714/E11.034 |
| 2005/0102551 A1 * | 5/2005 | Watanabe | ........... | G06F 11/1096 714/6.2 |
| 2008/0276057 A1 * | 11/2008 | Hetzler | ................. | G06F 3/0605 711/159 |
| 2013/0290775 A1 * | 10/2013 | Tucek | ................. | G06F 11/1076 714/E11.062 |
| 2017/0315745 A1 * | 11/2017 | Agombar | ............... | G06F 3/0631 |
| 2020/0310932 A1 * | 10/2020 | Hutchison | ............. | G06F 3/0644 |

* cited by examiner

*Primary Examiner* — Kaushikkumar M Patel
(74) *Attorney, Agent, or Firm* — Anderson Gorecki LLP

(57) ABSTRACT

A storage array includes a scalable drive cluster and non-scaling drive clusters on which RAID (D+P) protection groups are implemented using partition as protection group members. The scalable drive cluster is scaled by adding one or more new drives and moving protection group members onto the new drives. Reserve capacity is calculated based on scaling of the scalable drive cluster by converting unused partitions to reserve capacity when the cluster is scaled. When W=(D+P) new drives are added to the storage array the reserve capacity is replenished, if any was used, by moving protection groups from the scalable drive cluster to a non-scaling drive cluster created with the W new drives. Maintaining the reserve capacity on the scaling drive cluster improves function of the storage array because unutilized reserve capacity can be relocated during scaling without moving data.

20 Claims, 15 Drawing Sheets

| drive\partition | 0 | 1 | 2 | 3 | 4 | 5 | 6 | 7 | 8 |
|---|---|---|---|---|---|---|---|---|---|
| 0 | 0 | 1 | 2 | 3 | 4 | 5 | 6 | E7 | E8 |
| 1 | 1 | 2 | 3 | 4 | 5 | 6 | E7 | E8 | 0 |
| 2 | 2 | 3 | 4 | 5 | 6 | E7 | E8 | 0 | 1 |
| 3 | 3 | 4 | 5 | 6 | E7 | E8 | 0 | 1 | 2 |
| 4 | 4 | 5 | 6 | E7 | E8 | 0 | 1 | 2 | 3 |
| 5 | 5 | 6 | E7 | E8 | 0 | 1 | 2 | 3 | 4 |
| 6 | 6 | E7 | E8 | 0 | 1 | 2 | 3 | 4 | 5 |
| 7 | E7 | E8 | 0 | 1 | 2 | 3 | 4 | 5 | 6 |
| 8 | E8 | 0 | 1 | 2 | 3 | 4 | 5 | 6 | E7 |

Figure 6

| drive\partition | 0 | 1 | 2 | 3 | 4 | 5 | 6 | 7 | 8 |
|---|---|---|---|---|---|---|---|---|---|
| 0 |   |   | 2 | 3 | 4 | 5 | 6 | E7 | E8 |
| 1 |   |   | 3 | 4 | 5 | 6 | E7 | E8 | 0 |
| 2 |   |   | 4 | 5 | 6 | E7 | E8 | 0 | 1 |
| 3 |   |   | 5 | 6 | E7 | E8 | 0 | 1 | 2 |
| 4 |   |   | 6 | E7 | E8 | 0 | 1 | 2 | 3 |
| 5 |   |   | E7 | E8 | 0 | 1 | 2 | 3 | 4 |
| 6 |   |   | E8 | 0 | 1 | 2 | 3 | 4 | 5 |
| 7 |   |   | 0 | 1 | 2 | 3 | 4 | 5 | 6 |
| 8 |   |   | 1 | 2 | 3 | 4 | 5 | 6 | E7 |
| 9 | 0 | 1 | 2 | 3 | 4 | 5 | 6 | E7 | E8 |
| 10 | 1 | 2 | 3 | 4 | 5 | 6 | E7 | E8 | 0 |

| drive\partition | 0 | 1 | 2 | 3 | 4 | 5 | 6 | 7 | 8 |
|---|---|---|---|---|---|---|---|---|---|
| 0 | | | 2 | 3 | 4 | 5 | 6 | R7 | R8 |
| 1 | | | 3 | 4 | 5 | 6 | R7 | R8 | 0 |
| 2 | | | 4 | 5 | 6 | R7 | R8 | 0 | 1 |
| 3 | | | 5 | 6 | R7 | R8 | 0 | 1 | 2 |
| 4 | | | 6 | R7 | R8 | 0 | 1 | 2 | 3 |
| 5 | | | R7 | R8 | 0 | 1 | 2 | 3 | 4 |
| 6 | | | R8 | 0 | 1 | 2 | 3 | 4 | 5 |
| 7 | | | 0 | 1 | 2 | 3 | 4 | 5 | 6 |
| 8 | | | 1 | 2 | 3 | 4 | 5 | 6 | R7 |
| 9 | 0 | 1 | 2 | 3 | 4 | 5 | 6 | R7 | R8 |
| 10 | 1 | 2 | 3 | 4 | 5 | 6 | R7 | R8 | 0 |

Figure 8

| drive\partition | 0 | 1 | 2 | 3 | 4 | 5 | 6 | 7 | 8 |
|---|---|---|---|---|---|---|---|---|---|
| 0 | E9 | E10 | 2 | 3 | 4 | 5 | 6 | R7 | R8 |
| 1 | E9 | E10 | 3 | 4 | 5 | 6 | R7 | R8 | 0 |
| 2 | E9 | E10 | 4 | 5 | 6 | R7 | R8 | 0 | 1 |
| 3 | E9 | E10 | 5 | 6 | R7 | R8 | 0 | 1 | 2 |
| 4 | E9 | E10 | 6 | R7 | R8 | 0 | 1 | 2 | 3 |
| 5 | E9 | E10 | R7 | R8 | 0 | 1 | 2 | 3 | 4 |
| 6 | E9 | E10 | R8 | 0 | 1 | 2 | 3 | 4 | 5 |
| 7 | E9 | E10 | 0 | 1 | 2 | 3 | 4 | 5 | 6 |
| 8 | E9 | E10 | 1 | 2 | 3 | 4 | 5 | 6 | R7 |
| 9 | 0 | 1 | 2 | 3 | 4 | 5 | 6 | R7 | R8 |
| 10 | 1 | 2 | 3 | 4 | 5 | 6 | R7 | R8 | 0 |

| drive\partition | 0 | 1 | 2 | 3 | 4 | 5 | 6 | 7 | 8 |
|---|---|---|---|---|---|---|---|---|---|
| 11 | E11 | E12 | E13 | E14 | E15 | E16 | E17 | E18 | E19 |
| 12 | E11 | E12 | E13 | E14 | E15 | E16 | E17 | E18 | E19 |
| 13 | E11 | E12 | E13 | E14 | E15 | E16 | E17 | E18 | E19 |
| 14 | E11 | E12 | E13 | E14 | E15 | E16 | E17 | E18 | E19 |
| 15 | E11 | E12 | E13 | E14 | E15 | E16 | E17 | E18 | E19 |
| 16 | E11 | E12 | E13 | E14 | E15 | E16 | E17 | E18 | E19 |
| 17 | E11 | E12 | E13 | E14 | E15 | E16 | E17 | E18 | E19 |
| 18 | E11 | E12 | E13 | E14 | E15 | E16 | E17 | E18 | E19 |
| 19 | E11 | E12 | E13 | E14 | E15 | E16 | E17 | E18 | E19 |

Figure 9

| drive\partition | 0 | 1 | 2 | 3 | 4 | 5 | 6 | 7 | 8 |
|---|---|---|---|---|---|---|---|---|---|
| 0 | 9 | 10 | 2 | 3 | 4 | *5* | *6* | R7 | R8 |
| 1 | 9 | 10 | 3 | 4 | *5* | *6* | R7 | R8 | 0 |
| 2 | 9 | 10 | 4 | *5* | *6* | R7 | R8 | 0 | 1 |
| 3 | 9 | 10 | *5* | *6* | R7 | R8 | 0 | 1 | 2 |
| 4 | 9 | 10 | *6* | R7 | R8 | 0 | 1 | 2 | 3 |
| 5 | 9 | 10 | R7 | R8 | 0 | 1 | 2 | 3 | 4 |
| 6 | 9 | 10 | R8 | 0 | 1 | 2 | 3 | 4 | *5* |
| 7 | 9 | 10 | 0 | 1 | 2 | 3 | 4 | *5* | *6* |
| 8 | 9 | 10 | 1 | 2 | 3 | 4 | *5* | *6* | R7 |
| 9 | 0 | 1 | 2 | 3 | 4 | *5* | *6* | R7 | R8 |
| 10 | 1 | 2 | 3 | 4 | *5* | *6* | R7 | R8 | 0 |

| drive\partition | 0 | 1 | 2 | 3 | 4 | 5 | 6 | 7 | 8 |
|---|---|---|---|---|---|---|---|---|---|
| 11 | 5 | 6 | E11 | E12 | E13 | E14 | E15 | E16 | E17 |
| 12 | 5 | 6 | E11 | E12 | E13 | E14 | E15 | E16 | E17 |
| 13 | 5 | 6 | E11 | E12 | E13 | E14 | E15 | E16 | E17 |
| 14 | 5 | 6 | E11 | E12 | E13 | E14 | E15 | E16 | E17 |
| 15 | 5 | 6 | E11 | E12 | E13 | E14 | E15 | E16 | E17 |
| 16 | 5 | 6 | E11 | E12 | E13 | E14 | E15 | E16 | E17 |
| 17 | 5 | 6 | E11 | E12 | E13 | E14 | E15 | E16 | E17 |
| 18 | 5 | 6 | E11 | E12 | E13 | E14 | E15 | E16 | E17 |
| 19 | 5 | 6 | E11 | E12 | E13 | E14 | E15 | E16 | E17 |

Figure 10

| drive\partition | 0 | 1 | 2 | 3 | 4 | 5 | 6 | 7 | 8 |
|---|---|---|---|---|---|---|---|---|---|
| 0 | 9 | 10 | 2 | 3 | 4 | R21 | R22 | R7 | R8 |
| 1 | 9 | 10 | 3 | 4 | R21 | R22 | R7 | R8 | 0 |
| 2 | 9 | 10 | 4 | R21 | R22 | R7 | R8 | 0 | 1 |
| 3 | 9 | 10 | R21 | R22 | R7 | R8 | 0 | 1 | 2 |
| 4 | 9 | 10 | R22 | R7 | R8 | 0 | 1 | 2 | 3 |
| 5 | 9 | 10 | R7 | R8 | 0 | 1 | 2 | 3 | 4 |
| 6 | 9 | 10 | R8 | 0 | 1 | 2 | 3 | 4 | R21 |
| 7 | 9 | 10 | 0 | 1 | 2 | 3 | 4 | R21 | R22 |
| 8 | 9 | 10 | 1 | 2 | 3 | 4 | R21 | R22 | R7 |
| 9 | 0 | 1 | 2 | 3 | 4 | R21 | R22 | R7 | R8 |
| 10 | 1 | 2 | 3 | 4 | R21 | R22 | R7 | R8 | 0 |

Figure 11

| drive\partition | 0 | 1 | 2 | 3 | 4 | 5 | 6 | 7 | 8 |
|---|---|---|---|---|---|---|---|---|---|
| 0 | | 9 | 10 | *2* | *3* | *4* | R21 | R22 | R7 | R8 |
| 1 | | 9 | 10 | *3* | *4* | *R21* | R22 | R7 | R8 | 0 |
| 2 | | 9 | 10 | *4* | *R21* | *R22* | R7 | R8 | 0 | 1 |
| 3 | | 9 | 10 | *R21* | *R22* | *R7* | R8 | 0 | 1 | 2 |
| 4 | | 9 | 10 | *R22* | *R7* | *R8* | 0 | 1 | 2 | 3 |
| 5 | | 9 | 10 | *R7* | *R8* | *0* | 1 | 2 | 3 | 4 |
| 6 | | 9 | 10 | *R8* | *0* | *1* | 2 | 3 | 4 | R21 |
| 7 | | 9 | 10 | *0* | *1* | *2* | 3 | 4 | R21 | R22 |
| 8 | | 9 | 10 | *1* | *2* | *3* | 4 | R21 | R22 | R7 |
| 9 | | 0 | 1 | 2 | 3 | 4 | R21 | R22 | R7 | R8 |
| 10 | | 1 | 2 | 3 | 4 | R21 | R22 | R7 | R8 | 0 |
| 20 | | 2 | 3 | 4 | R21 | R22 | R7 | R8 | 0 | 1 |
| 21 | | 3 | 4 | R21 | R22 | R7 | R8 | 0 | 1 | 2 |
| 22 | | 4 | R21 | R22 | R7 | R8 | 0 | 1 | 2 | 3 |

Figure 12

| drive\partition | 0 | 1 | 2 | 3 | 4 | 5 | 6 | 7 | 8 |
|---|---|---|---|---|---|---|---|---|---|
| 0 | 9 | 10 | 18 | 19 | 20 | 23 | 24 | 25 | 26 |
| 1 | 9 | 10 | 18 | 19 | 20 | 23 | 24 | 25 | 26 |
| 2 | 9 | 10 | 18 | 19 | 20 | 23 | 24 | 25 | 26 |
| 3 | 9 | 10 | 18 | 19 | 20 | 23 | 24 | 25 | 26 |
| 4 | 9 | 10 | 18 | 19 | 20 | 23 | 24 | 25 | 26 |
| 5 | 9 | 10 | 18 | 19 | 20 | 23 | 24 | 25 | 26 |
| 6 | 9 | 10 | 18 | 19 | 20 | 23 | 24 | 25 | 26 |
| 7 | 9 | 10 | 18 | 19 | 20 | 23 | 24 | 25 | 26 |
| 8 | 9 | 10 | 18 | 19 | 20 | 23 | 24 | 25 | 26 |
| 9 | | 0 | 1 | 2 | 3 | 4 | R21 | R22 | R7 | R8 |
| 10 | | 1 | 2 | 3 | 4 | R21 | R22 | R7 | R8 | 0 |
| 20 | | 2 | 3 | 4 | R21 | R22 | R7 | R8 | 0 | 1 |
| 21 | | 3 | 4 | R21 | R22 | R7 | R8 | 0 | 1 | 2 |
| 22 | | 4 | R21 | R22 | R7 | R8 | 0 | 1 | 2 | 3 |
| 23 | | R21 | R22 | R7 | R8 | 0 | 1 | 2 | 3 | 4 |
| 24 | | R22 | R7 | R8 | 0 | 1 | 2 | 3 | 4 | R21 |
| 25 | | R7 | R8 | 0 | 1 | 2 | 3 | 4 | R21 | R22 |
| 26 | | R8 | 0 | 1 | 2 | 3 | 4 | R21 | R22 | R7 |

Figure 13

PREDICTIVE REDISTRIBUTION OF CAPACITY IN A FLEXIBLE RAID SYSTEM

TECHNICAL FIELD

The subject matter of this disclosure is generally related to electronic data storage and more particularly to unused storage capacity that is maintained in reserve by a data storage system that implements protection groups.

BACKGROUND

The disk drives in a typical data storage system are members of redundant array of independent drives (RAID) protection groups. RAID protection groups help to avoid data loss by enabling a failed member to be reconstructed. For example, a failed protection group member drive can be rebuilt on a spare drive. A RAID (D+P) protection group has D data members and P parity members. The data members store data. The parity members store parity information such as XORs of data values. The parity information enables reconstruction of data in the event that a data member fails. Parity information can be reconstructed from the data on the data members in the event that a parity member fails.

The total storage capacity of a data storage system can be increased to accommodate a greater amount of data. It is common practice to increase storage capacity while some free capacity is still available because a storage system cannot function efficiently when 100% of storage space is utilized. A target or minimum amount of unused storage capacity may be held in reserve until all other storage capacity is utilized. A storage admin may be prompted to increase storage capacity when any of the reserve storage capacity is utilized. For context and without limitation, a data storage system may be considered in need of additional storage capacity when more than 80%-90% of existing storage capacity is in use so 10%-20% of storage capacity may normally be held in reserve. The reserve capacity helps to maintain normal efficient operation of the storage system until additional drives can be installed.

The storage capacity of a data storage system that uses individual drives as protection group members is typically increased by adding W new drives for a RAID (D+P) implementation where W=(D+P). For example, a storage system that implements RAID-5 (4+1) may be scaled-up in increments of five new drives. Similarly, a RAID-5 (3+1) may be scaled-up in increments of four new drives.

SUMMARY

In accordance with some aspects an apparatus comprises: a storage array comprising: at least one compute node comprising at least one processor and non-transitory memory; a plurality of data storage drives that are accessed by the at least one compute node and used to store data that is accessed via the at least one compute node; and a drive manager configured to: create a scalable drive cluster from W of the drives each having W partitions each having a fixed-size amount of storage capacity equal to storage capacity of other partitions of the scalable drive cluster, wherein the drive manager implements redundant arrays of independent drives (RAID) each having D+P=W RAID protection group members that are initially symmetrically distributed to the partitions and no more than one member of a protection group is located on a single one of the drives; create reserve capacity using at least some of the partitions of the scalable drive cluster; scale the scalable drive cluster by adding at least one new drive to the scalable drive cluster and relocating at least some of the protection group members and reserve capacity to the at least one new drive; and replenish a utilized portion of the reserve capacity; whereby functioning of the storage array is improved by reducing data movement associated with scaling of the scalable drive cluster.

In accordance with some aspects a method that is implemented by a storage array with at least one compute node and a plurality of data storage drives that are accessed by the at least one compute node and used to store data that is accessed via the at least one compute node comprises: creating a scalable drive cluster from W of the drives, each of the drives having W partitions, each of the partitions having a fixed-size amount of storage capacity equal to storage capacity of other partitions of the scalable drive cluster; implementing redundant arrays of independent drives (RAID) each having D+P=W RAID protection group members that are initially symmetrically distributed to the partitions with no more than one member of a protection group located on a single one of the drives; creating reserve capacity using at least some of the partitions of the scalable drive cluster; scaling the scalable drive cluster by adding at least one new drive to the scalable drive cluster and relocating at least some of the protection group members and reserve capacity to the at least one new drive; and replenishing a utilized portion of the reserve capacity; whereby functioning of the storage array is improved by reducing data movement associated with scaling of the scalable drive cluster.

In accordance with some implementations a computer-readable storage medium stores instructions that when executed by a compute node cause the compute node to perform a method for using a storage array to reduce data movement associated with scaling of a scalable drive cluster, the method comprising: creating a scalable drive cluster from W of the drives, each of the drives having W partitions, each of the partitions having a fixed-size amount of storage capacity equal to storage capacity of other partitions of the scalable drive cluster; implementing redundant arrays of independent drives (RAID) each having D+P=W RAID protection group members that are initially symmetrically distributed to the partitions with no more than one member of a protection group located on a single one of the drives; creating reserve capacity using at least some of the partitions of the scalable drive cluster; scaling the scalable drive cluster by adding at least one new drive to the scalable drive cluster and relocating at least some of the protection group members and reserve capacity to the at least one new drive; and replenishing a utilized portion of the reserve capacity; whereby functioning of the storage array is improved by reducing data movement associated with scaling of the scalable drive cluster.

All examples, aspects and features mentioned in this document can be combined in any technically possible way. Other aspects, features, and implementations may become apparent in view of the detailed description and figures.

BRIEF DESCRIPTION OF THE FIGURES

FIG. 6 is a matrix representation of the scalable drive cluster illustrated in FIG. 5.

FIGS. 8 and 9 illustrate predictive reserve capacity and creation and distribution of new protection groups.

FIGS. 10 and 11 illustrate use and replenishment of reserve capacity.

FIGS. 12 and 13 illustrate further scaling and splitting of the scalable drive cluster.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
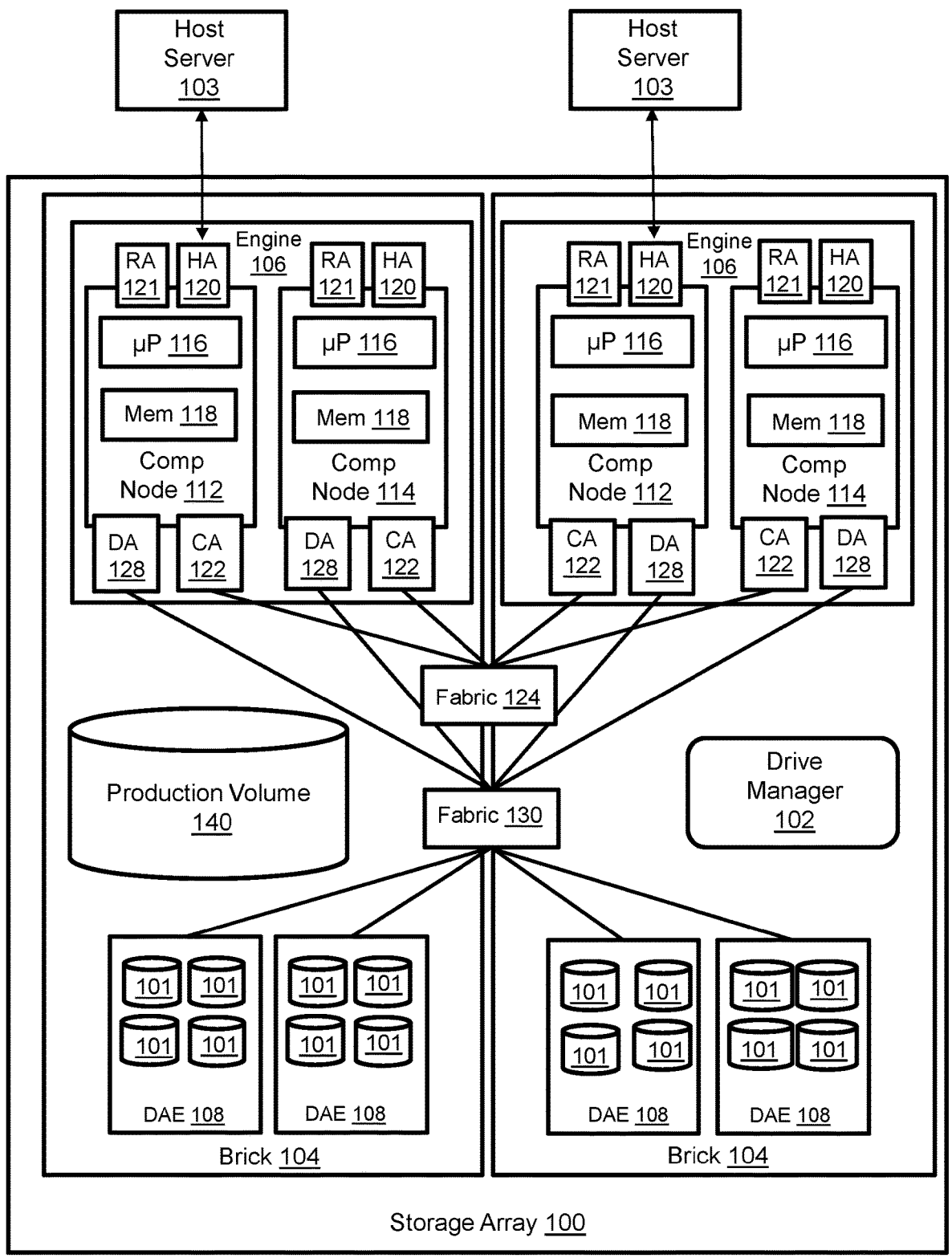
FIG. 1 illustrates a storage array with a drive manager that performs predictive redistribution of storage capacity.

FIG. 1 illustrates a storage array 100 with a drive manager 102 that performs predictive redistribution of storage capacity. The storage array is one example of a storage area network (SAN), which is one example of a data storage system in which the drive manager could be implemented. The storage array 100 is depicted in a simplified data center environment supporting two host servers 103 that run host applications. The host servers 103 include volatile memory, non-volatile storage, and one or more tangible processors. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g. for remote mirroring, backup, and replication. Each compute node also includes one or more drive adapters (DAs) 128 for communicating with managed drives 101 in the DAEs 108. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. A back-end connection group includes all drive adapters that can access the same drive or drives. In some implementations every drive adapter 128 in the storage array can reach every DAE via the fabric 130. Further, in some implementations every drive adapter in the storage array can access every managed drive 101.

Data associated with instances of the hosted applications running on the host servers 103 is maintained on the managed drives 101. The managed drives 101 are not discoverable by the host servers but the storage array creates a logical storage device 140 that can be discovered and accessed by the host servers. Without limitation, the logical storage device may be referred to as a storage object, source device, production volume, production device, or production LUN, where the logical unit number (LUN) is a number used to identify logical storage volumes in accordance with the small computer system interface (SCSI) protocol. From the perspective of the host servers 103, the production volume 140 is a single drive having a set of contiguous fixed-size logical block addresses (LBAs) on which data used by the instances of the host application resides. However, the host application data is stored at non-contiguous addresses on various managed drives 101. The compute nodes maintain metadata that maps between the production volume 140 and the managed drives 101 in order to process IOs from the hosts.

Figure 2:
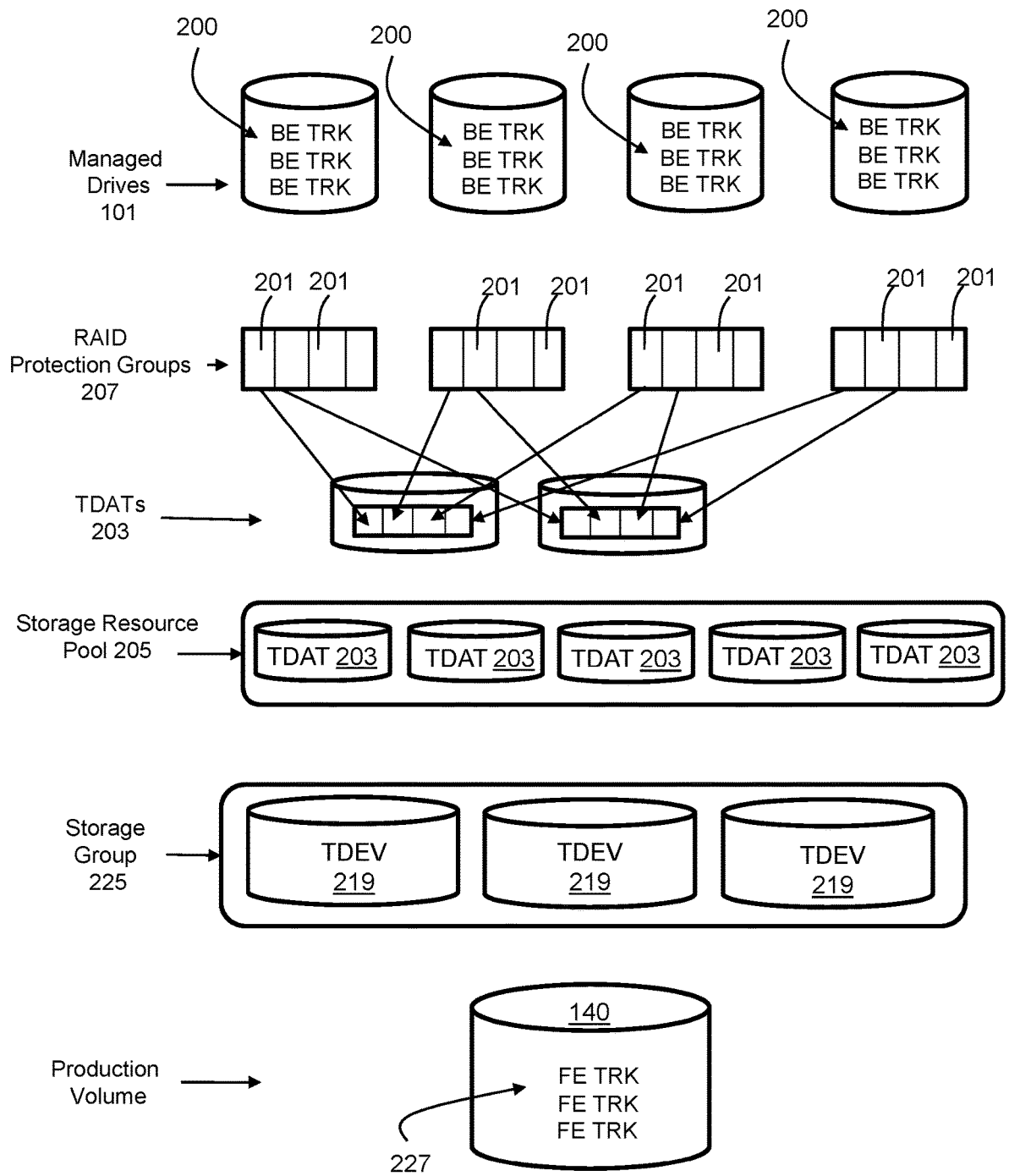
FIG. 2 illustrates layers of abstraction between the managed drives and the production volumes of the storage array of FIG. 1.

FIG. 2 illustrates layers of abstraction between the managed drives 101 and the production volume 140. The basic allocation unit of storage capacity that is used by the compute nodes to access the managed drives 101 is a back-end track (BE TRK) 200. In other words, the compute nodes do not access the managed drives using allocation units other than BE TRKs. BE TRKs all have the same fixed size which may be an integer multiple of the managed drive sector size. The managed drives 101 are each organized into partitions 201 of equal storage capacity, i.e. every partition has the same fixed size. Each partition 201 may include multiple BE TRKs. Selection of partition storage capacity is a design implementation and, for context and without limitation, may be some fraction or percentage of the capacity of a managed drive equal to an integer multiple of the sector size. Each partition may include a contiguous range of logical addresses. Groups of partitions that include partitions from different managed drives are used to create RAID protection groups 207. The RAID protection groups are distributed on data devices (TDATs) 203. A storage resource pool 205, also known as a "data pool" or "thin pool," is a collection of TDATs 203 of the same emulation and RAID protection group type, e.g. RAID-(8+1). In some implementations all TDATs in a drive group are of a single RAID protection group type and all have the same size (storage capacity). Logical thin devices (TDEVs) 219 are created using TDATs. The TDATs and TDEVs are accessed using BE TRKs as the allocation unit. Multiple TDEVs 219 are organized into a storage group 225. The production volume 140 is created from one or more storage groups. Host application data is stored in front-end tracks (FE TRKs) 227, that may be referred to as blocks, on the production volume 140. The FE TRKs 227 on the production volume 140 are mapped to BE TRKs 200 of the managed drives 101 by metadata. The storage array may create and maintain multiple production volumes.

Figure 3:
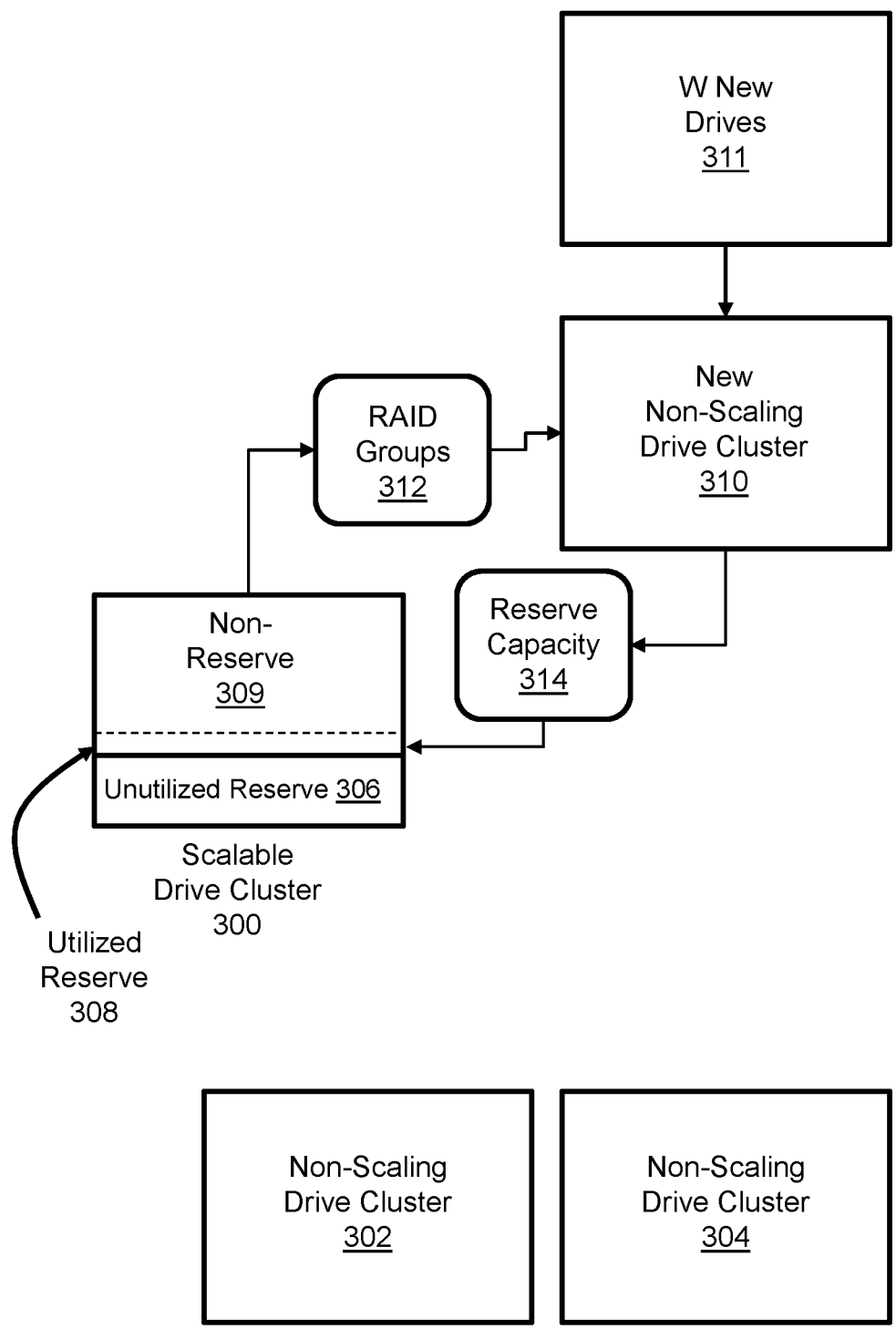
FIG. 3 illustrates use of W new drives to replenish reserve storage capacity maintained in a scalable drive cluster.

FIG. 3 illustrates use of W new drives to replenish reserve storage capacity maintained in a scalable drive cluster. Each RAID protection group 207 (FIG. 2) resides on a drive cluster. Each drive cluster is characterized by the distribution of protection group members on that drive cluster. Some drive clusters are scalable, e.g. new drives can be, and sometimes are, added to the drive cluster to increase the storage capacity of the drive cluster. Some drive clusters are non-scaling, i.e. the number of drives is static and new drives are not added to the drive cluster to increase the storage capacity of the drive cluster although failed drives may be rebuilt on spare drives. A scalable drive cluster 300 is used to maintain the reserve storage capacity for the storage array. Reserve storage capacity is the last x % or x MB of storage capacity of the storage array used to store host application data. The scalable drive cluster 300 includes both non-reserve storage capacity 309 and reserve storage capacity. The reserve storage capacity may include either or both unutilized reserve capacity 306 and utilized reserve capacity 308. More specifically, reserve storage capacity=unutilized reserve capacity+utilized reserve capacity. The reserve storage capacity is automatically and predictively determined by the drive manager. Non-scaling drive clusters 302, 304 in the storage array do not include reserve storage capacity. As will be explained below, maintaining the reserve storage capacity in the scalable drive cluster 300 advantageously facilitates scaling operations.

At least W drives are required to create a new drive cluster. When W new drives 311 are added to the storage array as a group then a new non-scaling drive cluster 310 is created using the W new drives. If necessary, the drive manager replenishes the reserve storage capacity of the storage array by moving RAID groups 312 from the scalable drive cluster 300 to the new non-scaling drive cluster 300, thereby creating reserve capacity 314 from unused capacity on the new non-scaling drive cluster and transferring that reserve capacity to the scalable drive cluster 300. The number of RAID groups that are moved, and thus the reserve capacity 314 replenished, may be calculated to be equal to the utilized reserve 308. Consequently, all the reserve storage capacity on the scalable drive cluster, and for the storage array, is unutilized following replenishment. The reserve capacity may be repeatedly tapped and replenished as data storage requirements increase and groups of W new drives are added.

Figure 4:
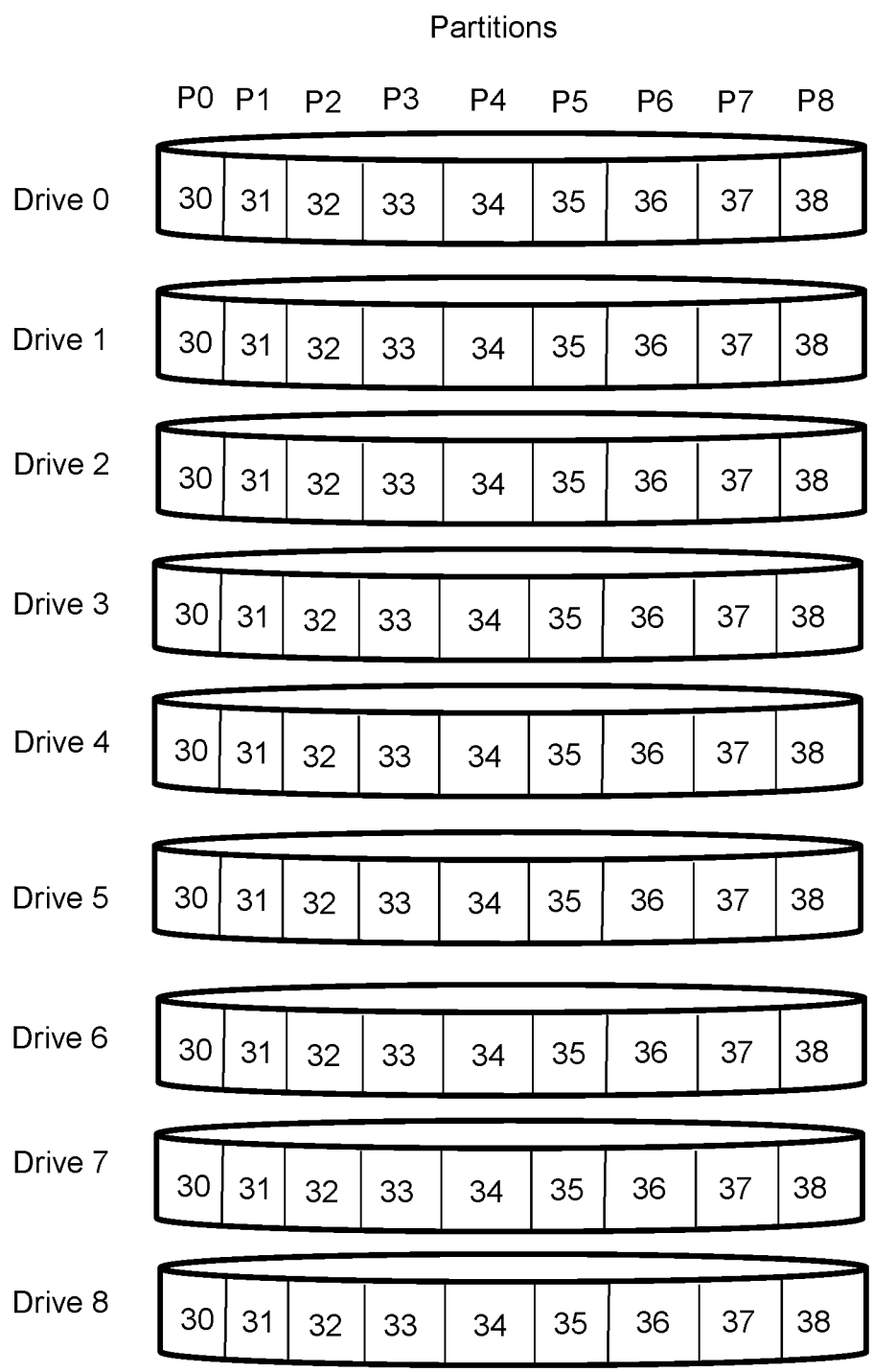
FIG. 4 illustrates protection group member distribution in a non-scaling drive cluster.

FIG. 4 illustrates protection group member distribution in a non-scaling drive cluster 320. Each drive in the non-scaling drive cluster has the same storage capacity and is divided into the same number of equally sized partitions. RAID protection group members are stored in the partitions. In accordance with RAID requirements, no more than one member of a protection group is stored on a single drive. A RAID (D+P) protection group is composed of one partition per drive over W drives, where RAID width W=D+P. Assuming the partitions and drives are both sequentially indexed (e.g. starting from 0), a minimal drive cluster has W drives and W partitions. RAID (8+1) is implemented in the illustrated example so there are 9 drives (designated drive 0 through drive 8) and 9 partition indices (designated P0 through P8). Nine protection groups are implemented with protection group members designated 30 through 38 in the illustrated example. Each protection group is distributed in a single partition across W drives. For example, all members of protection group 30 are in partition 0 of drives 0-8 and all members of protection group 33 are in partition 3 of drives 0-8.

Figure 5:
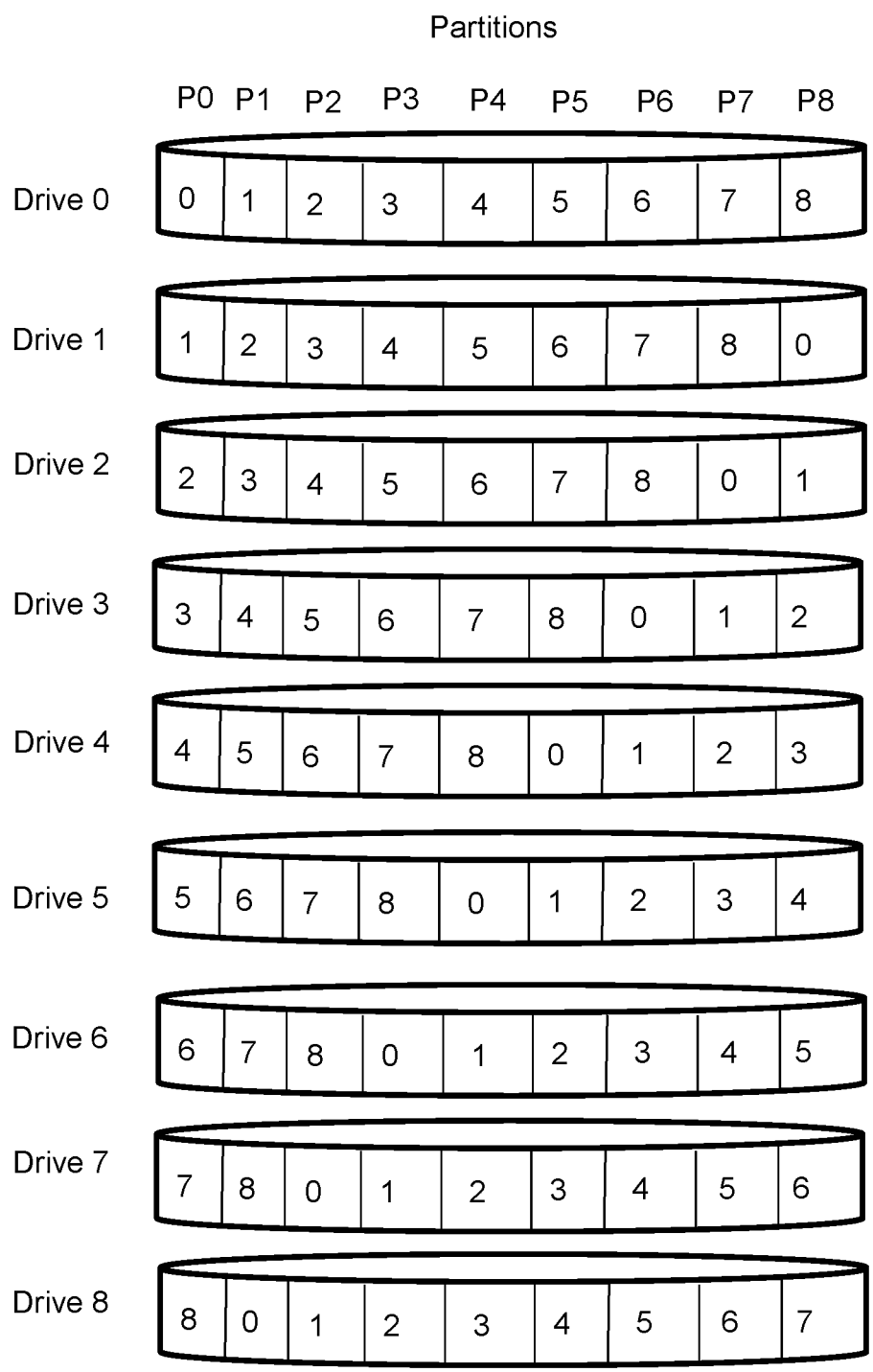
FIG. 5 illustrates protection group member distribution in a scalable drive cluster.

FIG. 5 illustrates protection group member distribution in a scalable drive cluster 322. The scalable drive cluster may initially be created with W drives and W partitions, which is referred to as a minimal drive cluster. A RAID (8+1) is implemented in the illustrated example so there are 9 drives (drive 0 through drive 8) and 9 partition indices (P0 through P8) in the minimal drive cluster. Nine protection groups are implemented with protection group members designated as 0 through 8 in the illustrated example. The protection groups are symmetrically distributed in order to facilitate scaling and splitting of the drive cluster. A wide variety of symmetrical distribution techniques could be implemented but in the illustrated example the technique for symmetrically distributing protection groups is to assign a member of a protection group m to a drive partition at drive X, partition Y using the algorithm: m=(X+Y) MODULO (D+P). The technique is described in U.S. patent application Ser. No. 16/891,116 titled Growing and Splitting a Disk Array by Moving RAID Group Members which is incorporated by reference. Letting X be a matrix column index for partitions and Y be the matric row index for drives, each RAID group may be represented by a number G (e.g. starting from 0) and partition X at drive Y is assigned to RAID group G, where G=(X+Y) modulo (W). Each RAID protection group has the same storage capacity as a single drive of the drive cluster.

FIG. 6 is a matrix representation of the scalable drive cluster illustrated in FIG. 5. The matrix has eight rows numbered 0-8 that represent drives 0-8 and eight columns numbered 0-8 that represent partition indices 0-8. Positions within the matrix represent locations of protection group members. The protection groups are populated with data in sequential order, e.g. protection group 0 followed by protection group 1, and so forth. The illustrated example represents the state of the drive cluster at a point in time when protection groups 0 through 6 have been populated and protection groups 7 and 8 have not yet been populated. The empty protection group members are designated E7, E9. Symmetry of distribution of protection groups based on protection group numbers is shown relative to a diagonal from drive 0, partition 0 to drive 8, partition 8.

Figure 7:
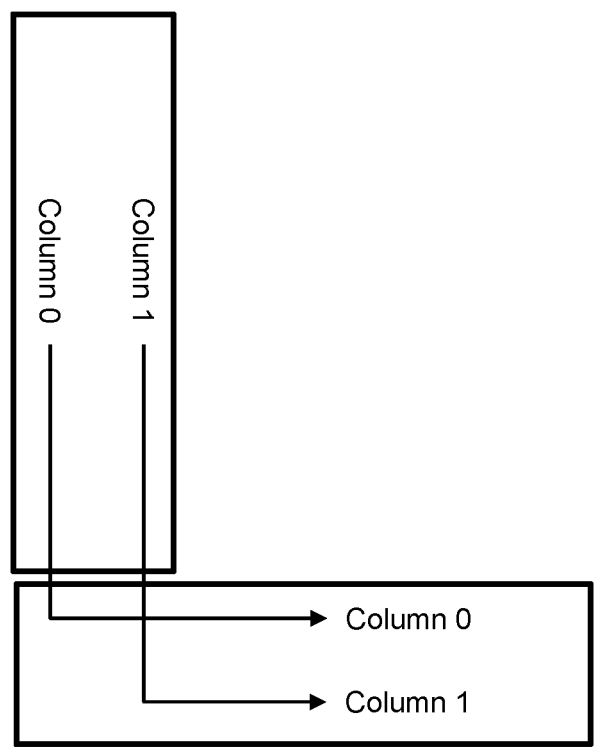
FIG. 7 illustrates scaling of the scalable drive cluster illustrated in FIG. 6.

FIG. 7 illustrates scaling of the scalable drive cluster shown in FIG. 6. In the illustrated example two new drives designated as drives 9 and 10 are added to the scalable drive cluster. The new drives have the same capacity as the existing drives, are sequentially numbered relative to the existing drives in the cluster and are organized with the same number of partitions as the existing drives. The two new drives are integrated with the W original drives by rotating partitions of the W original drives onto the new drives. More specifically, for each new drive that is added to the cluster in ordered succession the lowest numbered unrotated partition of the W original drives is rotated onto the new drive such that the protection group member at drive Dn is moved to partition Pn of the new drive. In the case of the empty protection group members E7 and E8 there is no data to be moved so the rotation does not require the same memory and processing resources as moving populated protection group members. This aspect is used to advantage by the drive manager. The metadata is updated to indicate the new locations of the populated and unpopulated protection group members. The partitions that are vacated as a result of rotation are free space that may be used for creation of new protection groups.

FIGS. 8 and 9 illustrate creation of predictive reserve capacity and creation and distribution of new protection groups. The initial expansion of the minimal scalable drive cluster of W original drives by addition of one or more new drives triggers prediction and creation of reserve capacity. The empty protection group members that are in existence in the minimal scalable drive cluster at the time of initial expansion of the minimal scalable drive cluster are converted to reserve capacity. In the illustrated example empty protection group members E7 and E8 are converted to reserve capacity designated R7 and R8. Although two empty protection groups are converted in the illustrated example, more or less than two empty protection groups might be converted to reserve capacity depending on the state of the minimal scalable drive cluster when creation of reserve capacity is triggered. Further, the minimal scalable drive cluster could be initially expanded by fewer or more than two new drives.

As specifically shown in FIG. 9, two new RAID protection groups 9 and 10 are created in the partitions that are vacated as a result of rotation. The new RAID protection groups are sequentially numbered relative to the existing protection groups and the members are distributed in single partitions. In the illustrated example a new RAID protection group 9, with empty members designated E9, is created in partition 0 of drives 0-8 and a new RAID protection group 10, with empty members designated E10, is created in partition 1 of drives 0-8. As additional storage space is required the empty protection group members E9, E10 of the new protection groups are used in sequence while the reserve capacity R7, R8 is held in reserve. The reserve capacity R7, R8 is only used for storing data if additional space is required for data storage and all RAID protection groups in the storage array are utilized (non-empty).

In the state of the drive clusters represented in FIG. 9, 80% of the storage capacity of the scaling drive cluster is utilized. 20% of the storage capacity is unutilized because two RAID groups represented by members E9, E10 are empty and there is unutilized reserve capacity R7, R8 equivalent to two additional RAID groups. The drive manager uses the state of the scalable drive cluster at the time the storage array capacity is initially expanded by W new drives to predict storage capacity usage between addition of new non-scaling drives clusters. More particularly, if the capacity of the storage array is expanded by adding W new drives when the scaling drive cluster is in the state shown in FIG. 9 the drive manager predicts that the same level of capacity usage will exist upon the next expansion by addition of W new drives. In the illustrated example a 9-drive expansion associated with addition of new drives 11 through 19 will increase the number of drives and RAID groups to 20. The new drives are used to create an independent non-scaling drive cluster with RAID (8+1) protection groups distributed vertically in single partitions. The 80% usage level at that time is the basis of a prediction by the drive manager that 16 out of 20 RAID groups of capacity will be used when the next expansion of W new drives occurs. In other words, 4 out of 20 RAID groups are predicted to remain free before the next capacity expansion of W new drives. However, the reserve capacity is tapped if necessary. The drive manager redistributes capacity to maintain and regain the corresponding reserve capacity in the scalable drive cluster or associated split-away independent scalable drive cluster.

FIGS. 10 and 11 illustrate use and replenishment of reserve capacity. Use of reserve capacity results in the scalable drive cluster having less than the predicted reserve capacity when W new drives are added. In that case the drive manager creates a new non-scaling drive cluster when W new drives are added and selects and moves one or more protection groups from the scalable drive cluster to the new non-scaling drive cluster to replenish the utilized reserve capacity. In the illustrated example the predicted usage level is 80% as described above and 90% of all storage capacity is utilized (the reserve capacity R7, R8 that is unutilized represents only 10% of the total capacity of the scalable drive cluster. The drive manager selects a number of protection groups representing the difference, which is 10% or two protection groups in the illustrated example. The drive manager moves the selected protection groups to the new non-scaling drive. Specifically, the protection groups are relocated to the lowest numbered partitions of the new non-scaling drive cluster and each protection group is located in a single partition. As specifically illustrated in FIG. 11, new reserve partitions R21, R22 are created in the space vacated by relocating the selected protection groups 5, 6 to the new non-scaling drive cluster. As a result, the predicted usage level of 80% is restored and the scaling drive cluster is configured for further scaling.

FIGS. 12 and 13 illustrate further scaling and splitting of the scalable drive cluster. As new drives are added to the scaling drive cluster the lowest numbered unrotated partition of the W original drives is rotated onto the new drive. Rotating reserve capacity partitions and empty protection group members incurs relatively little resource costs because there is no data to move. However, metadata is updated. The scalable drive cluster may be scaled by adding one or more new drives at different points in time. When W new drives have been added to the original W drives all the partitions of the W original drives will have been rotated onto the W new drives. As a result, the W original drives will each have members of vertically oriented single partition protection groups. The W new drives will contain the rotated symmetrically distributed protection group members and reserve partitions. Symmetry is preserved by rotation so the new drives will contain symmetrically distributed members and reserve partitions, albeit with individual members and reserve partitions in different relative positions in comparison with the original drives. The W original drives may be split away as an independent non-scaling drive cluster and the W new drives may be split away as an independent scalable drive cluster. In the illustrated example drives 0-8 are split away as a non-scaling drive cluster and drives 9, 10, and 20-26 are split away as a scalable drive cluster. The reserve capacity is maintained in the scalable drive cluster where it facilitates scaling because rotation of reserve capacity advantageously does not require movement of data.

Figure 14:
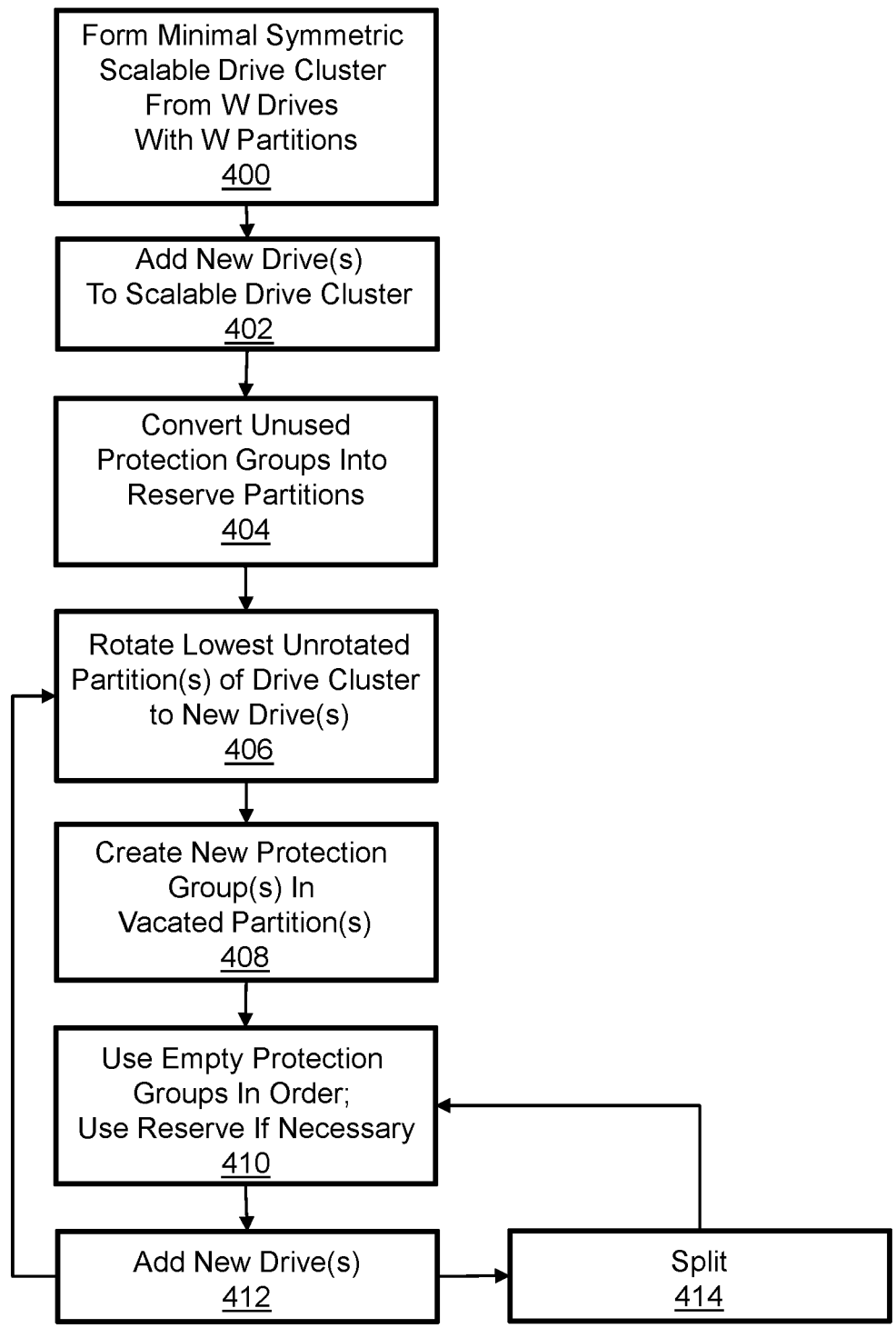
FIG. 14 illustrates steps associated with creation of predictive reserve capacity.

FIG. 14 illustrates steps associated with creation of predictive reserve capacity. A minimal symmetrical scalable drive cluster is formed from W drives with W partitions as indicated in step 400. This may include assigning a member of a protection group m to a drive partition at row X, column Y of the matrix using the algorithm: m=(X+Y) MODULO (D+P). Protection groups of the scalable drive cluster are populated with data in sequence starting with the lowest numbered protection group. Eventually one or more new drives are added to the scalable drive cluster as indicated in step 402. In response to the addition of the new drives any remaining unused protection groups on the W original drives of the scalable drive cluster are converted to reserve partitions as indicated in step 404. For each new drive added in step 402 the lowest numbered unrotated partition of the W original drives is rotated onto the new drive as indicated in step 406. As indicated in step 408, new protection groups are formed in the partitions that are vacated as a consequence of the rotation in step 406. As additional data storage capacity is required the empty protection groups are used first, in sequence, and the reserve capacity is used only if necessary due to lack of empty protection groups as indicated in step 410. New drives are eventually added as indicated in step 412. If as a result of the addition of new drives there are enough drives in total to support a split, e.g. 2*W drives in total in the drive cluster, then the drive cluster is split as indicated in step 414 into a symmetrical scalable drive cluster and a non-scaling drive cluster. The split-away scalable drive cluster is utilized as indicated in step 410 and may be scaled by adding new drives. Until there are enough drives to support a split the addition of new drives in step 412 prompts rotation of the lowest numbered unrotated partition of the W original drives is rotated onto the new drive as indicated in step 406.

Figure 15:
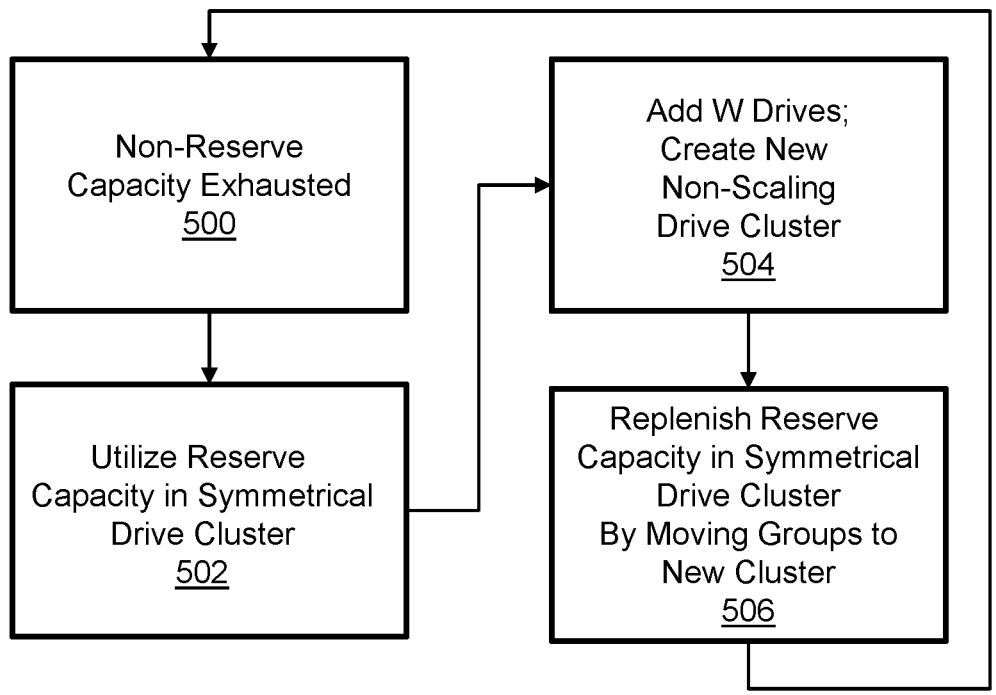
FIG. 15 illustrates steps associated with use and replenishment of reserve capacity.

FIG. 15 illustrates steps associated with use and replenishment of reserve capacity. As indicated in step 410 (FIG. 14) the empty protection groups are used in sequence as additional data storage capacity is required and the reserve capacity is used only if necessary due to lack of empty protection groups. When non-reserve capacity is exhausted as indicated in step 500 the reserve capacity is utilized for additional data storage as indicated in step 502. W new drives are added as a group and a new non-scaling drive cluster is created from those drives as indicated in step 504. In response, the drive manager replenishes the reserve capacity up to the predicted amount by moving RAID protection groups from the scalable drive cluster to the new non-scalable drive cluster as indicated in step 506. Partitions that are vacated by the moved protection groups are converted to reserve capacity. The illustrated steps may be iterated.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
a storage array comprising:
at least one compute node comprising at least one processor and non-transitory memory;
a plurality of data storage drives that are accessed by the at least one compute node and used to store data that is accessed via the at least one compute node; and
a drive manager configured to:
create a scalable drive cluster from W of the drives each having W partitions each having a fixed-size amount of storage capacity equal to storage capacity of other partitions of the scalable drive cluster, wherein the drive manager implements redundant arrays of independent drives (RAID) each having D+P=W RAID protection group members that are initially symmetrically distributed to the partitions and no more than one member of a protection group is located on a single one of the drives;
create reserve capacity using at least some of the partitions of the scalable drive cluster;
scale the scalable drive cluster by adding at least one new drive to the scalable drive cluster and relocating at least some of the protection group members and reserve capacity to the at least one new drive; and
replenish a utilized portion of the reserve capacity;
whereby functioning of the storage array is improved by reducing data movement associated with scaling of the scalable drive cluster.

2. The apparatus of claim 1 wherein the drive manager calculates reserve capacity in response to addition of at least one new drive to the W drives of the scalable drive cluster.

3. The apparatus of claim 2 wherein the drive manager creates the reserve capacity via conversion of unused capacity on the W drives of the scalable drive cluster to reserve capacity in response to addition of at least one new drive to the W drives of the scalable drive cluster.

4. The apparatus of claim 1 wherein the drive manager is configured to replenish the utilized portion of the reserve capacity by moving at least one protection group to new drives that are not members of the scalable drive cluster.

5. The apparatus of claim 4 wherein the new drives are part of a group of at least W new drives that are used to create a non-scaling drive cluster.

6. The apparatus of claim 1 wherein for each new drive that is added to the scalable cluster in ordered succession a lowest numbered unrotated partition of the W drives is rotated onto the new drive such that a protection group member at drive Dn is moved to partition Pn of the new drive.

7. The apparatus of claim 1 wherein the drive manager symmetrically distributes protection groups by assigning a member of a protection group m to a drive partition at drive X, partition Y using the algorithm: m=(X+Y) MODULO (D+P).

8. A method implemented by a storage array with at least one compute node and a plurality of data storage drives that are accessed by the at least one compute node and used to store data that is accessed via the at least one compute node, the method comprising:
creating a scalable drive cluster from W of the drives, each of the drives having W partitions, each of the partitions having a fixed-size amount of storage capacity equal to storage capacity of other partitions of the scalable drive cluster;
implementing redundant arrays of independent drives (RAID) each having D+P=W RAID protection group members that are initially symmetrically distributed to the partitions with no more than one member of a protection group located on a single one of the drives;
creating reserve capacity using at least some of the partitions of the scalable drive cluster;
scaling the scalable drive cluster by adding at least one new drive to the scalable drive cluster and relocating at least some of the protection group members and reserve capacity to the at least one new drive; and
replenishing a utilized portion of the reserve capacity;
whereby functioning of the storage array is improved by reducing data movement associated with scaling of the scalable drive cluster.

9. The method of claim 8 comprising calculating reserve capacity in response to addition of at least one new drive to the W drives of the scalable drive cluster.

10. The method of claim 9 comprising creating the reserve capacity by converting unused capacity on the W drives of the scalable drive cluster to reserve capacity in response to addition of at least one new drive to the W drives of the scalable drive cluster.

11. The method of claim 8 comprising replenishing the utilized portion of the reserve capacity by moving at least one protection group to new drives that are not members of the scalable drive cluster.

12. The method of claim 11 comprising utilizing the new drives to create a non-scaling drive cluster.

13. The method of claim 8 comprising, for each new drive that is added to the scalable cluster in ordered succession, rotating a lowest numbered unrotated partition of the W drives onto the new drive such that a protection group member at drive Dn is moved to partition Pn of the new drive.

14. The method of claim 8 comprising symmetrically distributing protection groups by assigning each member of a protection group m to a drive partition at drive X, partition Y using the algorithm: m=(X+Y) MODULO (D+P).

15. A non-transitory computer-readable storage medium storing instructions that when executed by a compute node cause the compute node to perform a method for using a storage array to reduce data movement associated with scaling of a scalable drive cluster, the method comprising:
creating a scalable drive cluster from W of the drives, each of the drives having W partitions, each of the partitions having a fixed-size amount of storage capacity equal to storage capacity of other partitions of the scalable drive cluster;
implementing redundant arrays of independent drives (RAID) each having D+P=W RAID protection group members that are initially symmetrically distributed to the partitions with no more than one member of a protection group located on a single one of the drives;
creating reserve capacity using at least some of the partitions of the scalable drive cluster; scaling the scalable drive cluster by adding at least one new drive to the scalable drive cluster and relocating at least some of the protection group members and reserve capacity to the at least one new drive; and
replenishing a utilized portion of the reserve capacity;
whereby functioning of the storage array is improved by reducing data movement associated with scaling of the scalable drive cluster.

16. The non-transitory computer-readable storage medium of claim 15 wherein the method further comprises calculating reserve capacity in response to addition of at least one new drive to the W drives of the scalable drive cluster.

17. The non-transitory computer-readable storage medium of claim 16 wherein the method further comprises creating the reserve capacity by converting unused capacity on the W drives of the scalable drive cluster to reserve capacity in response to addition of at least one new drive to the W drives of the scalable drive cluster.

18. The non-transitory computer-readable storage medium of claim 15 wherein the method further comprises replenishing the utilized portion of the reserve capacity by moving at least one protection group to new drives that are not members of the scalable drive cluster.

19. The non-transitory computer-readable storage medium of claim 18 wherein the method further comprises utilizing the new drives to create a non-scaling drive cluster.

20. The non-transitory computer-readable storage medium of claim 15 wherein the method further comprises, for each new drive that is added to the scalable cluster in ordered succession, rotating a lowest numbered unrotated partition of the W drives onto the new drive such that a protection group member at drive Dn is moved to partition Pn of the new drive.

* * * * *